US007243132B2

(12) United States Patent
Choi

(10) Patent No.: US 7,243,132 B2
(45) Date of Patent: Jul. 10, 2007

(54) APPARATUS AND METHOD FOR CONTROLLING A DEVICE IN A HOME NETWORK BASED UPON A BATCH COMMAND THAT IS GENERATED WHEN A NAME OF THE BATCH COMMAND, A NAME OF THE DEVICE, A SERVICE OF THE DEVICE AND DETAILS RELATED TO THE SERVICE ARE SEQUENTIALLY SELECTED

(75) Inventor: Moon-jeong Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 487 days.

(21) Appl. No.: 10/061,289

(22) Filed: Feb. 4, 2002

(65) Prior Publication Data

US 2002/0107933 A1    Aug. 8, 2002

(30) Foreign Application Priority Data

Feb. 3, 2001    (KR)    ............................ 2001-5287

(51) Int. Cl.
*G06F 15/16* (2006.01)
(52) U.S. Cl. .................. 709/208; 709/203; 709/225; 718/101; 718/102; 707/102; 715/704; 715/744
(58) Field of Classification Search ............... 709/208, 709/224, 227, 229, 232, 223, 201, 203, 225; 707/102; 715/704, 744; 700/3; 718/101, 718/102
See application file for complete search history.

(56) References Cited

U.S. PATENT DOCUMENTS 5,321,835 A * 6/1994 Tanaka et al. ............... 718/101

5,835,370 A * 11/1998 Nakamura ..................... 700/3

(Continued)

FOREIGN PATENT DOCUMENTS

CN    1265753 A    9/2000

(Continued)

OTHER PUBLICATIONS

Corcoran, P. M. et al., "Browser-style interfaces to a home automation network", IEEE Transactions on Consumer Electronics Jun. 11-13, 1997, Printed Nov. 1997, vol. 43, Issue: 4, pp. 1063-1069.*

(Continued)

*Primary Examiner*—Oanh Duong
(74) *Attorney, Agent, or Firm*—Sughrue Mion, PLLC

(57) ABSTRACT

Apparatus and method for controlling devices within a home network, and a home network system employing the same. The apparatus for controlling a plurality of devices connected in the home network includes a batch processing portion for generating a batch command for a certain service of services provided by the plurality of devices, to process the certain service as one job, and a control portion for controlling when a batch command is selected, the control portion for controlling a certain device that is designated by the selected batch command operates in accordance with the selected batch command. Accordingly, operations of the devices within the home network for providing the service can be processed as one job.

6 Claims, 8 Drawing Sheets

U.S. PATENT DOCUMENTS

| | | | | |
|---|---|---|---|---|
| 5,850,429 | A | * | 12/1998 | Joyce et al. ............... 379/88.1 |
| 6,085,236 | A | | 7/2000 | Lea |
| 6,104,872 | A | * | 8/2000 | Kubota et al. .............. 717/110 |
| 6,243,707 | B1 | * | 6/2001 | Humpleman et al. ....... 707/102 |
| 6,288,716 | B1 | * | 9/2001 | Humpleman et al. ....... 715/733 |
| 6,452,612 | B1 | * | 9/2002 | Holtz et al. ................. 715/723 |
| 6,507,948 | B1 | * | 1/2003 | Curtis et al. ................ 717/174 |
| 6,546,419 | B1 | * | 4/2003 | Humpleman et al. ....... 709/223 |
| 6,572,288 | B1 | * | 6/2003 | Funahashi ................... 400/62 |
| 6,690,392 | B1 | * | 2/2004 | Wugoski .................... 715/744 |
| 6,724,409 | B1 | * | 4/2004 | Maddocks et al. .......... 715/853 |
| 2001/0043698 | A1 | * | 11/2001 | Furukawa et al. .......... 379/354 |

FOREIGN PATENT DOCUMENTS

| | | | |
|---|---|---|---|
| CN | 1269033 | A | 10/2000 |
| EP | 0 929 170 | A2 | 7/1999 |
| JP | 3-123925 | A | 5/1991 |
| JP | 6-202794 | A | 7/1994 |
| JP | 09-305360 | | 11/1997 |
| JP | 10-308758 | | 11/1998 |
| JP | 11-088965 | | 3/1999 |
| JP | 11-187061 | A | 7/1999 |
| JP | 2000-38840 | | 2/2000 |
| JP | 2000-209674 | A | 7/2000 |
| JP | 2000-231402 | | 8/2000 |
| WO | 98/59283 | A2 | 12/1998 |
| WO | 00/04427 | A1 | 1/2000 |
| WO | 00/76130 | A1 | 12/2000 |
| WO | WO 2004102343 | A2 * | 11/2004 |

OTHER PUBLICATIONS

Saito, T. et al., "Gateway technologies for home network and their implementations", Distributed Computing Systems Workshop, 2001 International Conference on ☐☐Apr. 16-19, 2001, pp. 175-180.*

* cited by examiner

APPARATUS AND METHOD FOR CONTROLLING A DEVICE IN A HOME NETWORK BASED UPON A BATCH COMMAND THAT IS GENERATED WHEN A NAME OF THE BATCH COMMAND, A NAME OF THE DEVICE, A SERVICE OF THE DEVICE AND DETAILS RELATED TO THE SERVICE ARE SEQUENTIALLY SELECTED

BACKGROUND OF THE INVENTION

1. Field of the Invention

The present invention relates to a home network, and more particularly to a method for providing a service in a manner of processing a set of pre-selected services with one batch command. The present application is based on Korean Patent Application No. 2001-5287 filed on Feb. 3, 2001, which is incorporated herein by reference.

2. Description of the Related Art

These days, due to advanced communication technology, many devices in home like information communicating devices such as personal computers, faxes, printers, etc., A/V devices such as TVs, DVDs, VCRs, etc., and home appliances such as electric cookers, refrigerators, washing machines, etc. are connected and used in a network under an external control. Studies are also under way to find out a more efficient method for providing service through such a network.

Meanwhile, the method for providing service through such a network has been disclosed by the same applicant in Korean Patent Application No. 2000-57991 filed Oct. 2, 2000, entitled 'Apparatus and method for controlling device in home network and system employing the same'.

FIG. 1 is a flowchart for explaining a conventional method for controlling devices in a home network.

Referring to FIG. 1, first, a web browser is activated in a device (step S102).

The device is accordingly connected to a URL of a lookup server that stores information about the devices connected through the home network (step S104). The lookup server will be described in greater detail later.

Then as shown in FIG. 2(a), a homepage displaying a list of devices connected in the home network is downloaded (step S106). In the homepage, every available device is displayed in the form of an icon.

A user selects one from the list of devices (step S108). Accordingly, the user is connected to a dynamic IP address of the selected device, and the homepage of the selected device is displayed (step S110).

If the user clicks on an icon representing a digital TV 01 (DTV 01), the homepage of the DTV is displayed as in FIG. 2(b). The reference character 'M' represents a cursor of a mouse.

The homepage of the selected device displays a list of available services.

The user selects one from the list of available services provided by the selected device (step S112). Then a sub-page, showing details of the selected service, is displayed (step S114).

If the user selects a service 3 in the screen of FIG. 2(b), the screen is displayed as in FIG. 2(c).

The user also selects the particulars of the selected service (step S116). According to the selected particulars, the selected device performs the selected service (step S118).

For example, if turning-on the DTV is the selected service, the DTV is turned on as in FIG. 2(d).

Although the detail of the selected service is selected once in the above description for the simplicity of description, there often is a case when the detail has to be selected more than once according to the type of the selected service.

Since the user has to select each device, service, and item related to the service every time he/she needs to use the service, the user experiences the inconvenience of having to carry out a set of routines in order to use the service.

Also, although the conventional method for providing the service through the home network uses a graphical user interface for the convenience of the user, the user still experiences inconvenience since he/she has to activate many steps until he/she finally activates the service.

Also, even for repeating the same service, the user still has to go back to the start and activate many steps.

SUMMARY OF THE INVENTION

The present invention has been made to overcome the above-mentioned problems of the related art, and accordingly, it is an object of the present invention to provide an apparatus and method for controlling devices connected in a home network that is capable of controlling service operation of the devices as one batch job.

The above object is accomplished by an apparatus for controlling a plurality of devices connected in a home network in accordance with the present invention, including a batch processing portion for generating a batch command for a certain service of services provided by the plurality of devices, to process the certain service as one job, and a control portion for controlling when a batch command is selected, the control portion for controlling a certain device that is designated by the selected batch command operates in accordance with the selected batch command.

When a batch command name, a name of the certain device, the service of the certain device, and details related to the service are selected, the batch processing portion records the selected items sequentially and generates a batch command based on the recorded items, and the certain device operates in accordance with the batch command.

Further, the batch processing portion displays a list of the stored batch commands, for selecting a batch command from the list that corresponds to a service desired by a user.

The above object is also accomplished by a method for controlling a plurality of devices connected in a home network in accordance with the present invention, including the steps of a) selecting a service from services provided by the plurality of devices, to process the service as one job, b) generating and storing a batch command with respect to the selected service, and c) when the batch command is selected, controlling a certain device designated by the selected batch command to operate in accordance with the selected batch command.

The above object is also accomplished by a home network system in accordance with the present invention, including a plurality of devices that provide services, and a lookup server that generates a batch command for certain service if the certain service is selected from the services provided by the plurality of devices to be processed as one job, the lookup server controls a certain device if the certain device is designated by a batch command that is selected.

The above object is also accomplished by a home network system in accordance with the present invention, including a plurality of devices that provide services, and a lookup server that generates a batch command for certain service if the certain service is selected from the services provided by the plurality of devices, the lookup server controls a certain device if the certain device is designated by a batch command that is selected.

BRIEF DESCRIPTION OF THE DRAWINGS

The above-mentioned object and the features of the present invention will be more apparent by describing the preferred embodiment of the present invention in detail referring to the appended drawings, in which.

DETAILED DESCRIPTION OF PREFERRED EMBODIMENT

An apparatus and a method for controlling devices in a home network and a home network system employing the same in accordance with the preferred embodiment of the present invention, will be described in greater detail with reference to the accompanying drawings.

Figure 1:
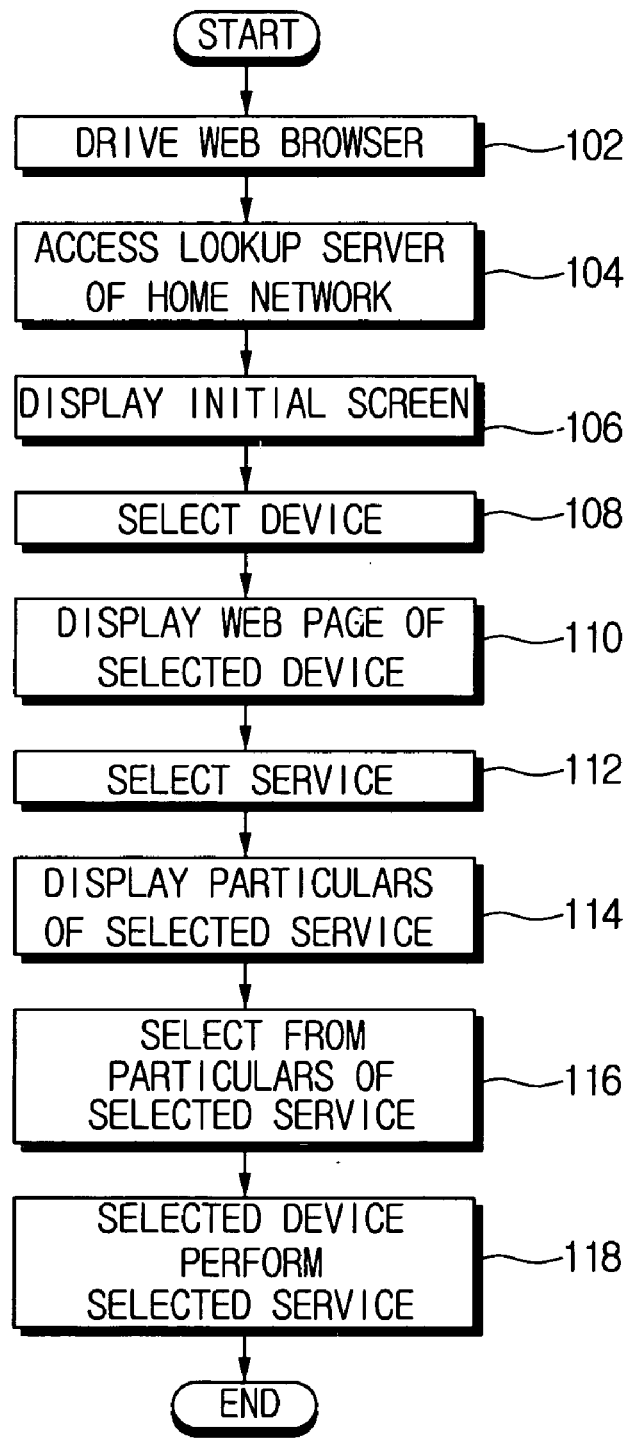
FIG. 1 is a flowchart for illustrating a conventional method for controlling devices within a home network.
Figure 2A:
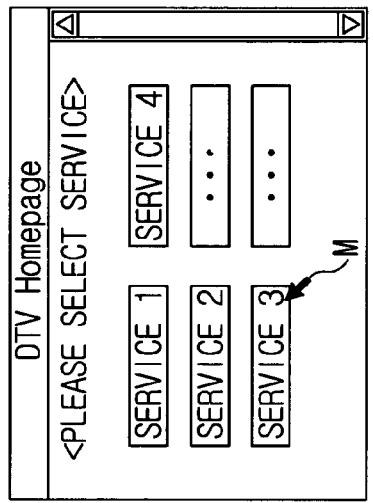
FIG. 2(a) is a view showing a screen that displays a home page of the home network of FIG. 1.
Figure 2B:
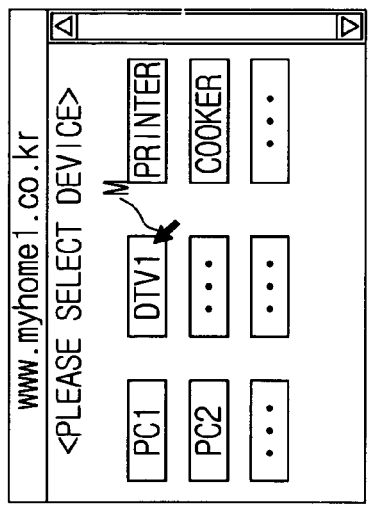
FIG. 2(b) is a view showing a screen that is displayed when a DTV icon is clicked in the screen of FIG. 2(a)
Figure 2C:
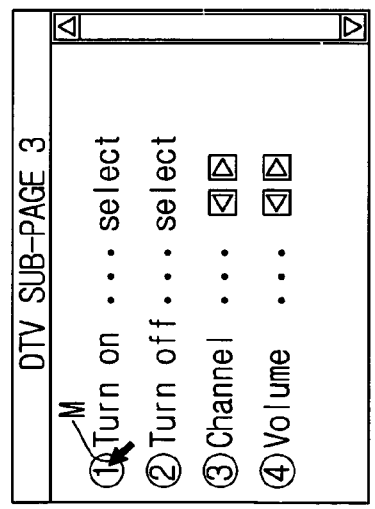
FIG. 2(c) is a view showing a screen displayed when a service 3 is selected in the screen of FIG. 2(b)
Figure 2D:
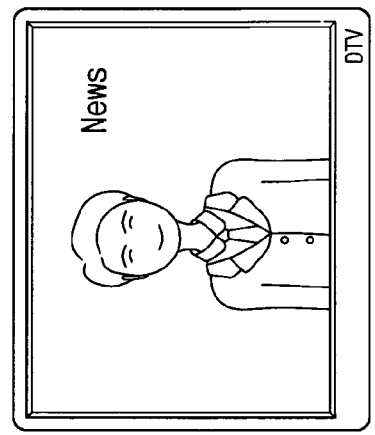
FIG. 2(d) is a view showing a screen displayed when service ① is selected from the screen of FIG. 2(c)
Figure 3:
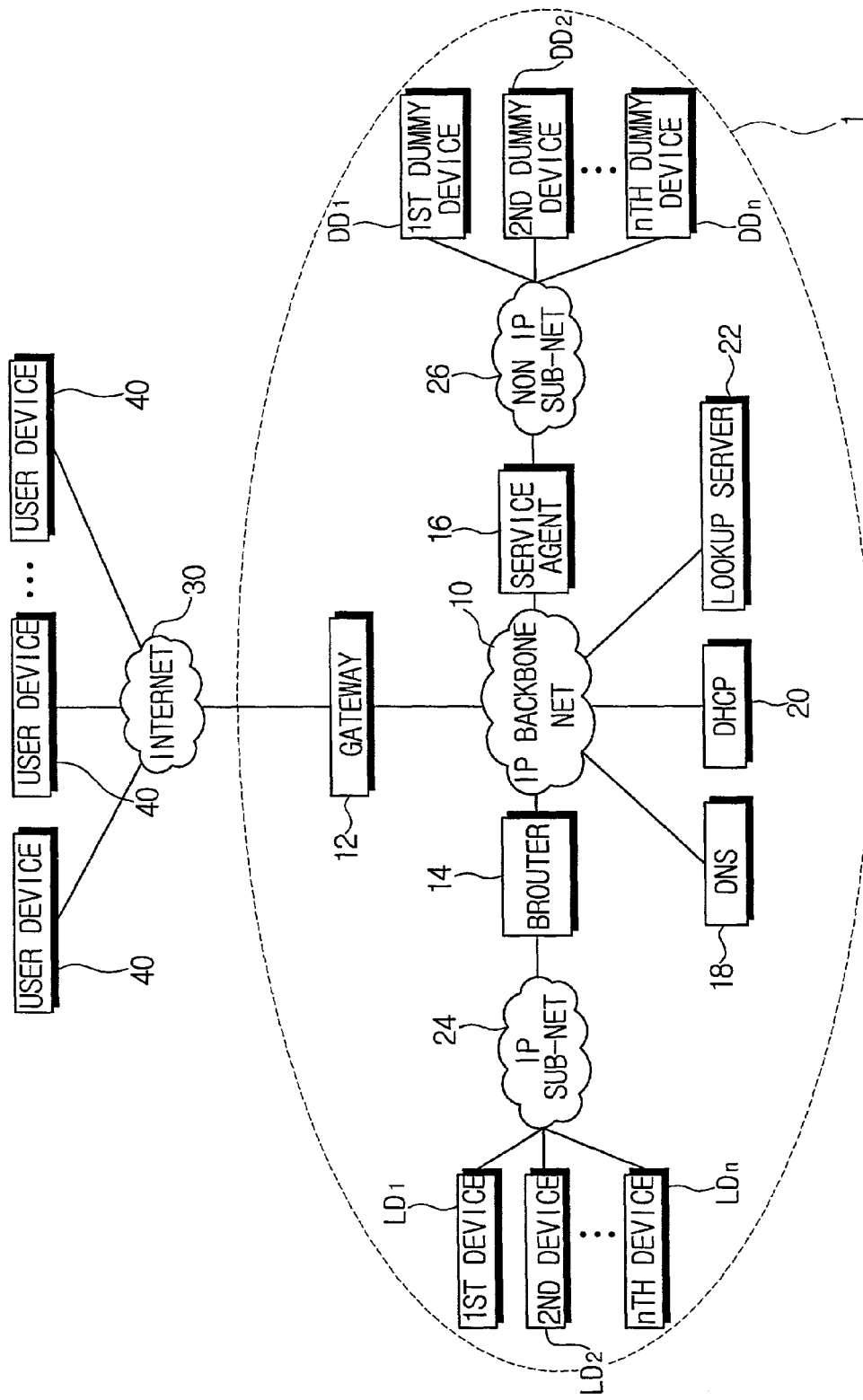
FIG. 3 is a view showing the construction of a system that controls the devices within the home network.

FIG. 3 is a view showing the construction of the system that controls the devices within the home network.

As shown in FIG. 3, a plurality of external user devices 40 is connected to a home network 1 through the Internet 30.

The home network 1 includes an IP backbone net 10, a gateway 12, a brouter 14, a service agent 16, a DNS server 18, a DHCP server 20, a lookup server 22, an IP sub-net 24, a non-IP sub-net 26, first through nth devices (LD1–LDn) connected to the IP sub-net 24, and first through nth dummy devices (DD1–DDn) connected to the non-IP sub-net 26.

The DHCP 20 provides the devices within the home network 1 with dynamic IP addresses.

In order to designate the plurality of devices connected to the home network 1, the home network 1 uses a dynamic IP address that is exclusively used within the home network 1.

The gateway 12 is an access node for the home network 1, which enables the home network 1 to communicate with external networks inclusive of other home networks.

The DNS server 18 provides the devices within the home network 1 with host names. The host name can be made by a user, or the user may simply use the default name that is made to represent the function of the device.

The IP sub-net 24 is a network in which intelligent devices having self-control ability are connected.

The brouter 14 serves as a bridge and a router, and exists between the IP backbone net 10 and the IP sub-net 24. The brouter 14 finds a path of an IP packet that is transmitted between the backbone net 10 and the IP sub-net 24.

The non-IP sub-net 26 is a network in which dummy devices are connected. The dummy devices, such as lamps, doors, washing machines, etc., have no self-control ability, but simply operate in a predetermined way.

The service agent 16 exists between the non-IP sub-net 26 and the IP backbone net 10, to maintain the service of the dummy devices.

Further, for the dummy devices that are connected to the non-IP sub-net 26, the service agent 16 is allocated with the dynamic IP addresses from the DHCP 20 and maintains the allocated dynamic IP addresses.

For the dummy devices, the service agent 16 also maintains the status of the dummy devices such as on/off status, or connectional status to the home network 1.

The lookup server 22 will be described in greater detail below.

Figure 4:
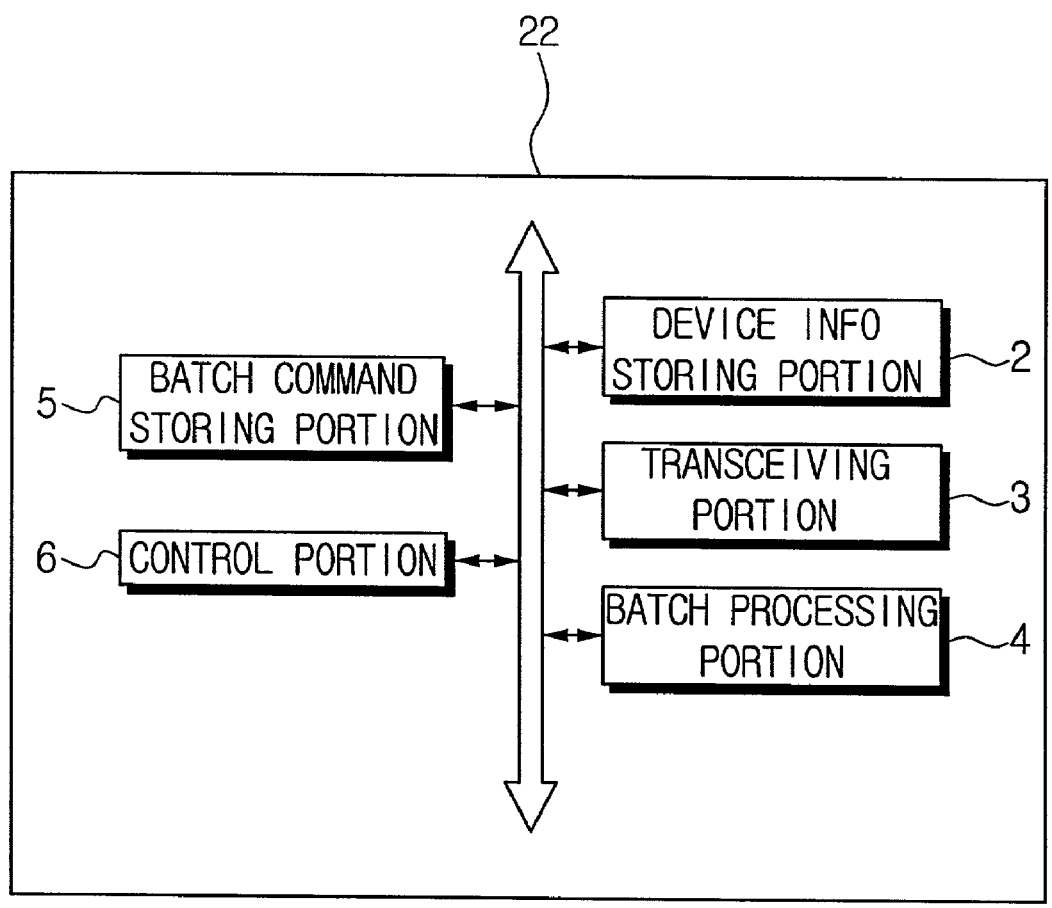
FIG. 4 is a block diagram of the lookup server of FIG. 3.

FIG. 4 is a block diagram of the lookup server 22 of FIG. 3.

The lookup server 22 includes a device information storing portion 2, a transceiving portion 3, a batch processing portion 4, a batch command storing portion 5, and a control portion 6.

The device information storing portion 2 stores information about the devices connected to the home network 1, such as a dynamic IP address allocated to the device, ID of the device, device type, vendor, model name, serial number, or the like.

When the batch command is selected by the user, the transceiving portion 3 transmits the batch command to a destination device designated by the batch command.

The batch command designates the name of the device corresponding to the selected service, the service name, and the details of the service.

The batch processing portion 4 generates a batch command for a service that is required to be processed at a batch job. By the batch processing, data can be processed as one job. Also, once the batch command is generated, the user is only allowed to select the batch command, and has no control over the batch command processing itself.

The batch processing portion 4 traces and records the clicks made by the user when selecting the service, and generates a batch command based on such traced selections and stores the batch command in the batch command storing portion 5.

When transmitting the batch command through the transceiving portion 3, the control portion 6 converts the name of the device into an actual IP address and transmits the converted IP address.

Figure 5:
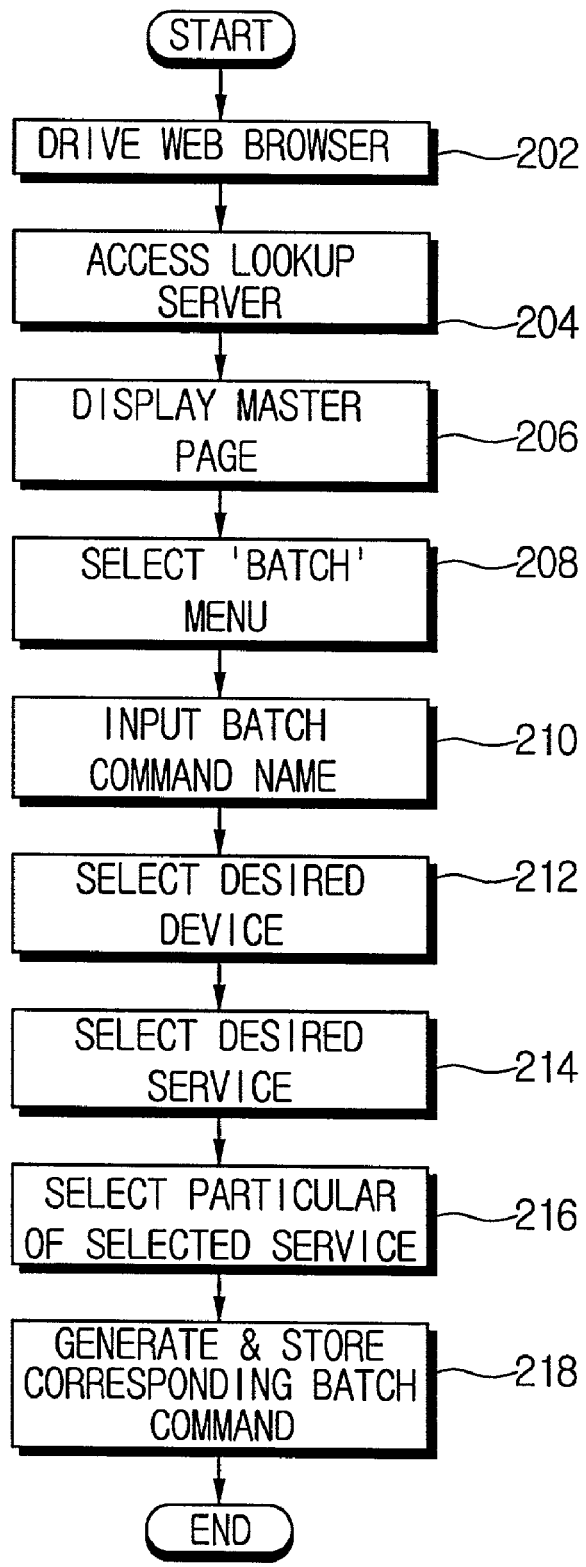
FIG. 5 is a flowchart for illustrating a process of generating a batch file with a method for controlling the devices within the home network in accordance with the present invention.

FIG. 5 is a flowchart for showing the process of generating a batch file with a method for controlling the device in the home network in accordance with the present invention.

Referring to FIG. 5, the web browser is activated in the user device (step S202).

Accordingly, the user device is connected to the URL of the lookup server that stores information about the devices connected in the home network (step S204).

Figure 6A:
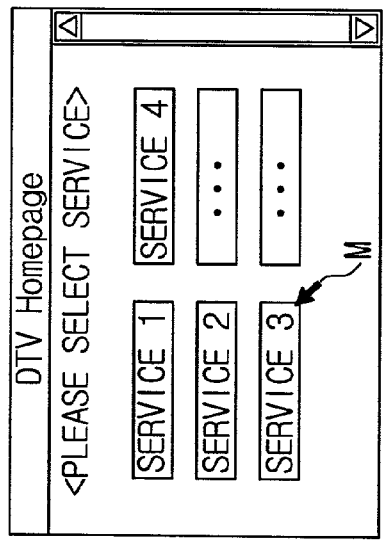
FIG. 6(a) is a view showing a screen that displays a home page of the home network of FIG. 3.

Then as shown in FIG. 6(a), a master page 50 is displayed (step S206).

The master page 50 includes not only a list 52 of every device available in the home network 1, but also a list 54 of the batch commands stored in the lookup server.

If the user connected to the lookup server wants a batch processing for a certain service, the user selects a 'batch' menu 56 in the master page 50 prior to activating the service (step S208). According to the 'batch' menu 56, the batch processing portion 4 functions to generate the batch command.

Then the user inputs the name of the batch command (step S210). Any name is good for the name of the batch command, but it is more preferable that the name of the batch command clearly represents the function of the corresponding service.

Then the user selects a device for the service (step S212).

Figure 6B:
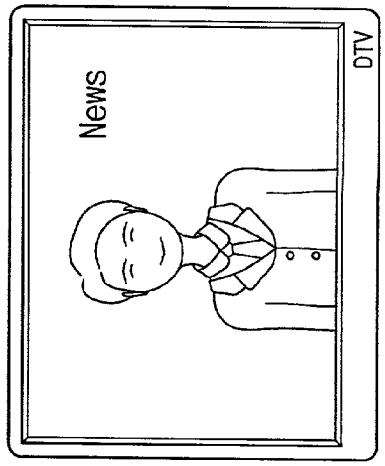
FIG. 6(b) is a view showing a screen displayed when a DTV icon is clicked in the screen of FIG. 6(a)

If the user clicks on the digital TV (DTV) 01 icon in the screen of FIG. 6(a), the homepage of the DTV is displayed as in FIG. 6(b).

Then the user selects a service from the service list provided by the homepage of the selected device (step S214).

If the service 3 is selected in the screen of FIG. 6(b), a sub-page indicating details of the selected service 3 is displayed.

Figure 6C:
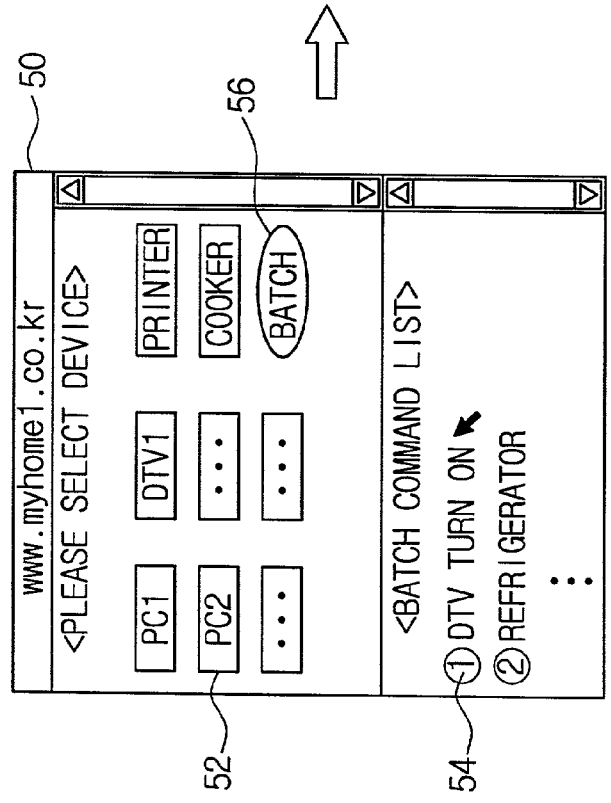
FIG. 6(c) is a view showing a screen displayed when a service 3 is selected in the screen of FIG. 6(b)
Figure 6D:
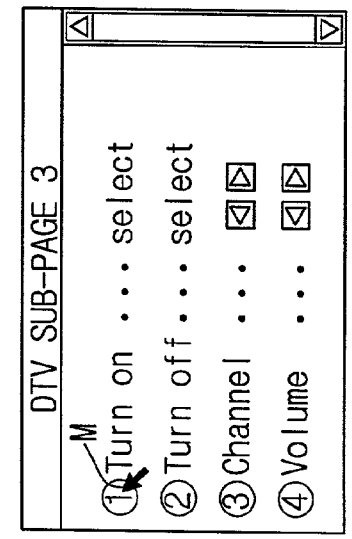
FIG. 6(d) is a view showing a screen displayed when a service ① is selected in the screen of FIG. 6(c)

Again, the user selects one of the details of the selected service 3 in the screen of FIG. 6(c) (step S216).

Then the batch processing portion 4 of the lookup server 22 traces and records the data about the above operations related to the service selection, such as a unique local device name, a service name, etc.

According to the recorded data about the operations related to the service selection, the batch processing portion 4 generates a batch command that activates the service of the device selected by the user, and then stores the batch command in the batch command storing portion 5 (step S218).

Figure 7:
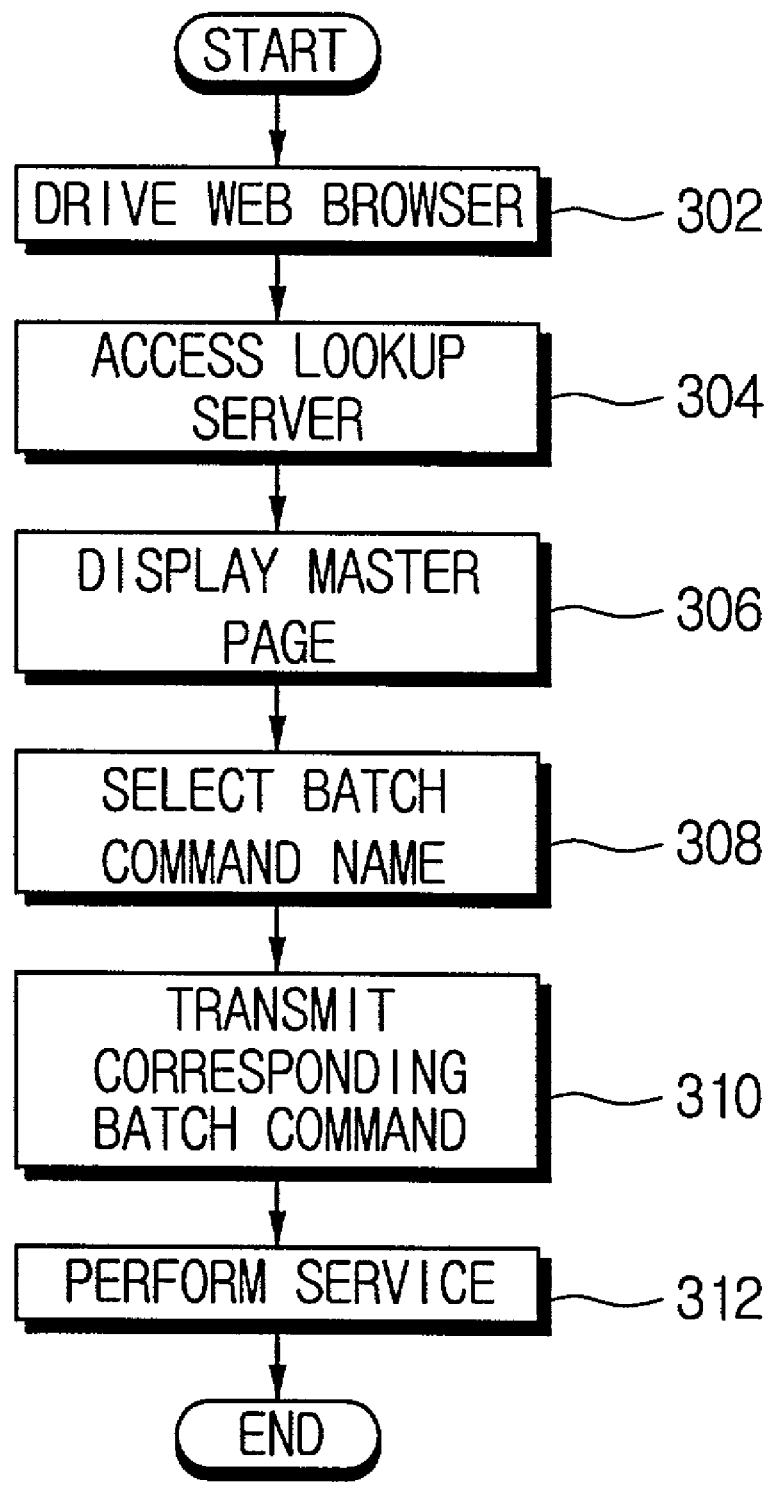
FIG. 7 is a flowchart for showing the process of activating a batch file with the method for controlling the devices within the home network in accordance with the present invention.

FIG. 7 is a flowchart for illustrating the process of activating the batch file with the method for controlling the devices within the home network in accordance with the present invention.

Referring to FIG. 7, a web browser is activated in a user device (step S302). Accordingly, the user device is connected to the lookup server (step S304).

Figure 8B:
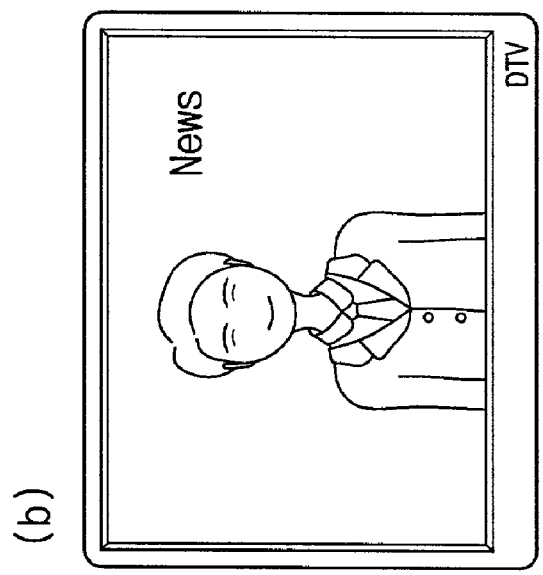
FIG. 8(b) is a view showing a screen displayed when a batch command 'DTV TURNON' is selected in the screen of FIG. 8(a).
Figure 8A:
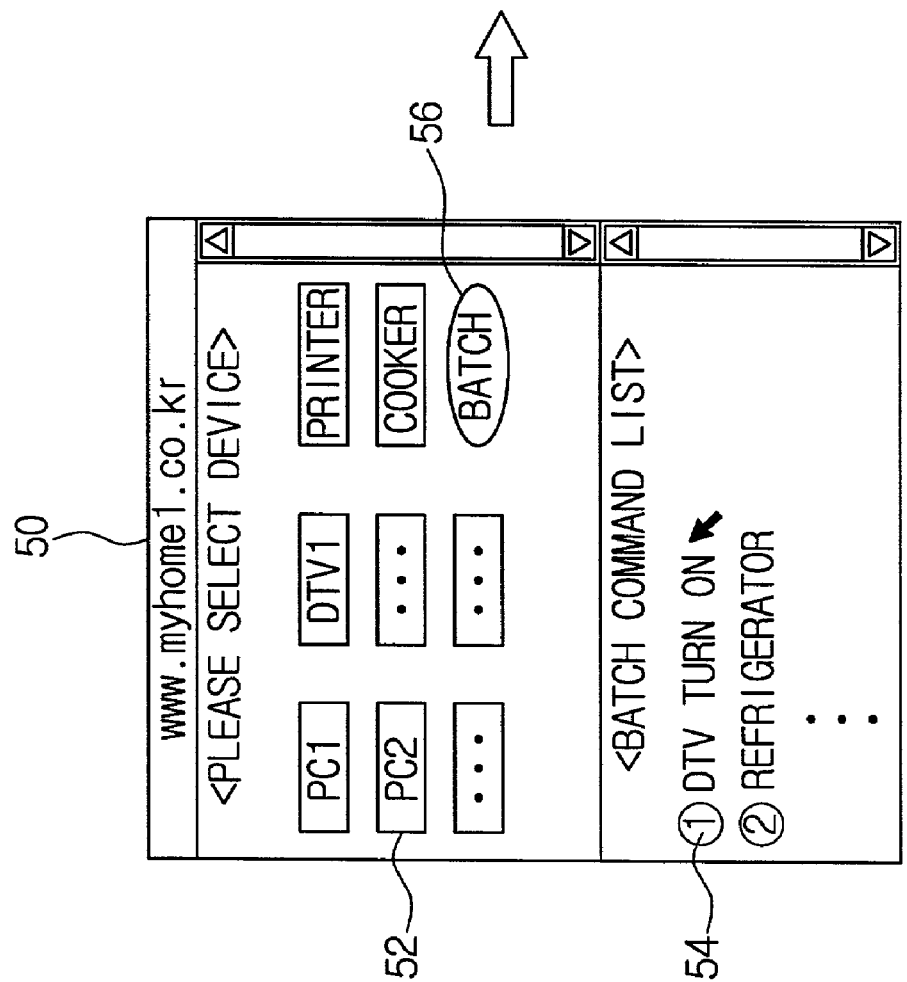
FIG. 8(a) is a view showing a screen that displays the homepage of the home network of FIG. 3.

Then as shown in FIG. 8(a), the master page is displayed (step S306). Then the user selects one batch command name from the batch command list 54 displayed in the master page 50 (step S308).

Then the batch command corresponding to the selected batch command name is transmitted from the lookup server to the corresponding device (step S310), and the corresponding device activates the service in accordance with the batch command (step S312).

FIG. 8(a) shows one example of the screen that displays the master page 50 of the lookup server of FIG. 4.

As shown in FIG. 8(a), the master page 50 displays not only the list 52 of every available device in the home network that the lookup server belongs to, but also the list 54 of the batch commands stored in the lookup server.

From the list 54 of the batch commands, the batch command name ① "DTV1 TURNON" represents the service that turns on the DTV1.

If the user selects the batch command name, "DTV1 TURNON", the batch command stored in the batch command storing portion 5 corresponding to the "STV1 TURNON" is transmitted to the DTV1, and as shown in FIG. 8(b), the STV1 is turned on.

As described above, according to the apparatus and method for controlling the devices in the home network 1 and the home network system employing the same, the service operations of the devices in the home network 1 can be controlled to be processed in one step.

Further, since the user does not have to select every step to activate the service of the device every time the user wants the service, the user is saved from inconvenience.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An apparatus for controlling a plurality of devices connected in a home network, the apparatus comprising:

a batch processing portion that generates a batch command to select at least one of the plurality of devices and select at least one of operations performed by the selected device;

a batch command storing portion that stores the batch command generated by the batch processing portion;

a device information storing portion that stores IP addresses allocated to the plurality of devices;

a transceiving portion that transmits the batch command according to the IP addresses; and a control portion that displays a list of batch commands stored in the batch command storing portion, and if one batch command is selected from the list, the control portion controls the transceiving portion to transmit the selected one batch command to a corresponding IP address of the selected device designated by the selected one batch command such that the selected performs the selected operation, wherein, when a name of the batch command, a name of the selected device, a service of the selected device, and details related to the service are sequentially selected, the batch processing portion records the selected name of the batch command, the selected name of the selected device, the selected service of selected device, and the selected details related to the service in order, and generates the batch command based on the recorded selected name of the batch command, the recorded selected name of the selected device, the recorded selected service of the selected device, and the recorded selected details related to the service in an order that the selected device performs the selected service.

2. The apparatus of claim 1, wherein the control portion displays the list of the batch commands on an area ofa master page.

3. A method for controlling a plurality of devices connected in a home network, the method comprising the steps of:

a) selecting a service from services provided by the plurality of devices, to process the service at one job;

b) generating and storing a batch command with respect to the selected service; and c) when the batch command is selected, controlling a certain device of the plurality of devices designated by the selected batch command to operate in accordance with the selected batch command, wherein, when the batch command is selected, the step c) further comprises the step of transmitting the selected batch command to an IP address of the certain device designated by the batch command, and wherein, when a name of the batch command, a name of the certain device, a service of the certain device, and details related to the service are sequentially selected, the selected name of the batch command, the selected name of the certain device, the selected service of the certain device, and the selected details related to the service are recorded in order, and the batch command is generated based on the recorded selected name of the batch command, the recorded selected name of the certain device, the recorded selected service of the certain device, and the selected details related to the service in an order that the certain device performs the selected service.

4. The method of claim 3, wherein the step c) further comprises the step of displaying a list of the stored batch command, and one batch command that corresponds to the selected service is selected from the list of the stored batch command.

5. A method for controlling a plurality of devices connected in a home network, the method comprising the steps of:

a) selecting a service from services provided by the plurality of devices, to process the service at one job;

b) generating and storing a batch command with respect to the selected service; and c) when the batch command is selected, transmitting the selected batch command to an IP address of a certain device of the plurality of devices designated by the batch command and controlling the certain device designated by the selected batch command to operate in accordance with the selected batch command, wherein the step b) comprises the steps of:

recording a name of the batch command, a name of the certain device, the selected service, and details related to the selected service in order when the name of the batch command, the name of the certain device, the selected service, and the details related to the selected service are sequentially selected; and generating the batch command based on the recorded selected name of the batch command, the recorded selected name of the selected device, the recorded selected service of the selected device, and the recorded selected details related to the selected service for operating the certain device to perform the selected service, and storing the generated batch command.

6. A home network system comprising:

a plurality of devices that provide services; and a lookup server that generates a batch command for certain service if the certain service is selected from the services provided by the plurality of devices, the lookup server controls a certain device of the plurality of devices if the certain device is designated by the batch command that is selected, wherein said lookup server comprises:

a device information storing portion for storing IP addresses allocated to the plurality of devices; and a transceiving portion for transmitting the batch command to an IP address of the certain device that is designated by the selected batch command when the batch command is selected, and wherein, when a name of the batch command, a name of the certain device, a service of the certain device, and details related to the service are sequentially selected, the selected name of the batch command, the selected name of the certain device, the selected service of the certain device, and the selected details related to the service are recorded in order, and the batch command is generated based on the recorded selected name of the batch command, the recorded selected name of the certain device, the recorded selected service of the certain device, and the selected details related to the service in an order that the certain device performs the selected service.

* * * * *